R. B. PRICE.
APPARATUS FOR VULCANIZING RUBBER.
APPLICATION FILED MAR. 3, 1905.
1,081,330.
Patented Dec. 16, 1913.
2 SHEETS—SHEET 1.
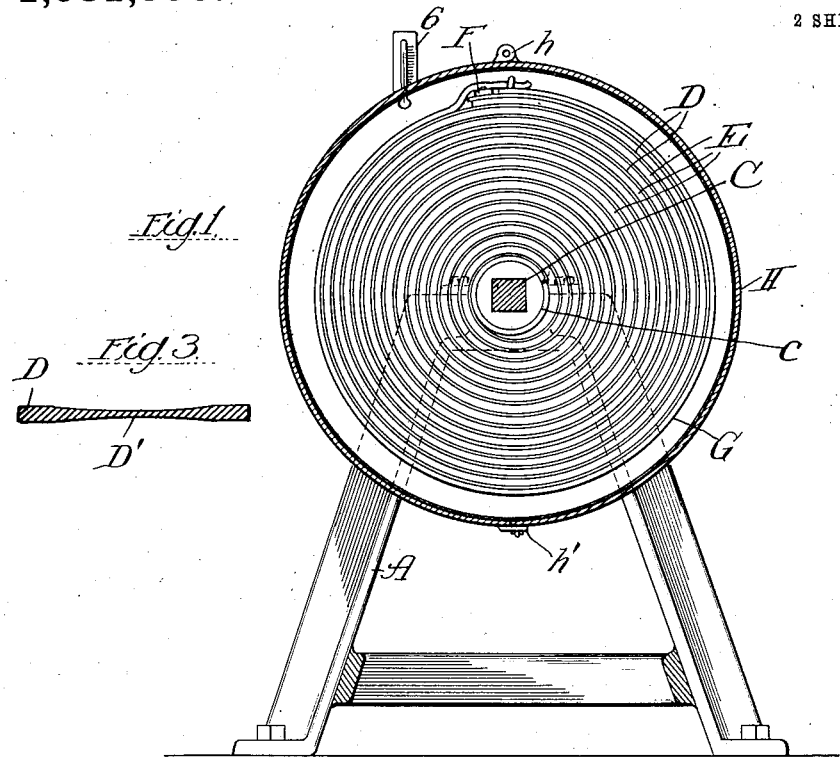
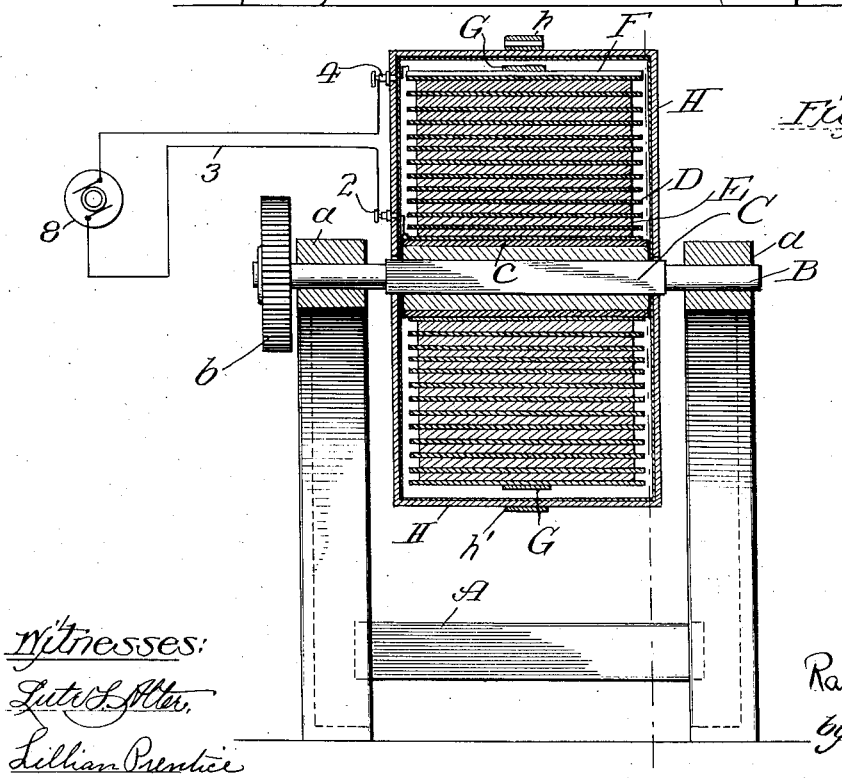

R. B. PRICE.
APPARATUS FOR VULCANIZING RUBBER.
APPLICATION FILED MAR. 3, 1905.
1,081,330.
Patented Dec. 16, 1913.
2 SHEETS—SHEET 2.
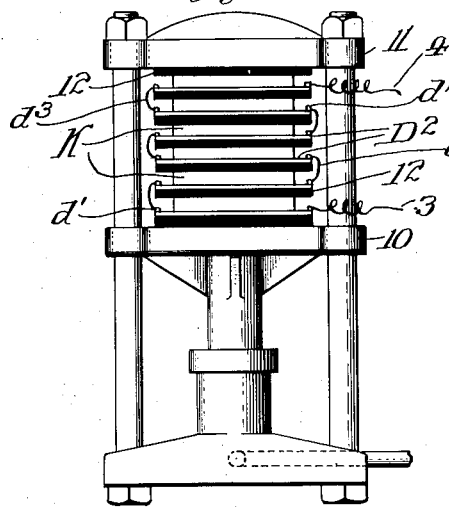
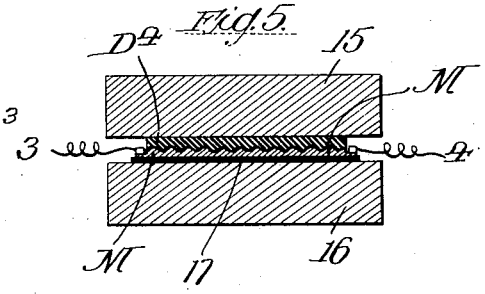
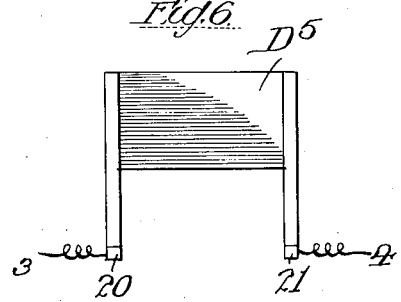
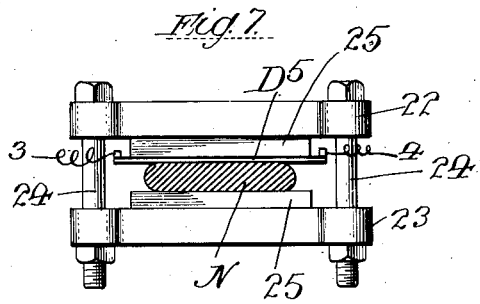
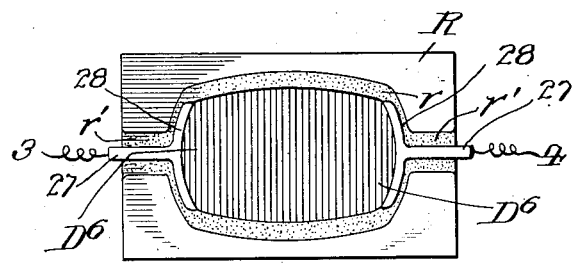
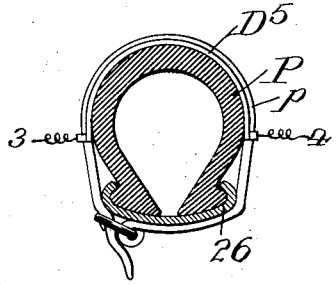
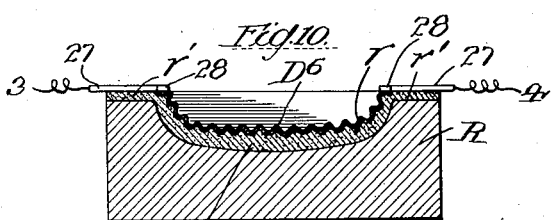
Witnesses:
Inventor:
Raymond B. Price
by Peirce & Fisher
Attorneys

UNITED STATES PATENT OFFICE.

RAYMOND B. PRICE, OF CHICAGO, ILLINOIS.

APPARATUS FOR VULCANIZING RUBBER.

1,081,330.   Specification of Letters Patent.   Patented Dec. 16, 1913.

Application filed March 3, 1905. Serial No. 248,244.

*To all whom it may concern:*

Be it known that I, RAYMOND B. PRICE, a citizen of the United States, residing in Chicago, in the county of Cook and State of Illinois, have invented certain new and useful Improvements in Apparatus for Vulcanizing Rubber, of which I do declare the following to be a full, clear, and exact description, reference being had to the accompanying drawings, forming part of this specification.

The present invention has for its object to provide certain improvements in apparatus for vulcanizing rubber by electricity; and the invention consists in the features of novelty hereinafter described and particularly pointed out in the claims at the end of this specification.

While certain features of my invention are susceptible of use in the vulcanization of various articles of rubber, the invention relates more especially to the vulcanization of thin layers of sheets of rubber (under which term are included articles coated or impregnated with rubber) such as belting, packing and like rubber goods.

In order that the salient points of the invention may be more readily understood, I would briefly compare its advantages with the method now most commonly employed in the vulcanization of belting, packing and similar goods. Heretofore, belting, packing and such like rubber goods as are of relatively small thickness and of considerable length have been vulcanized either by clamping one section after another of the belting or like strip between steam-heated press plates until the entire length of the strip was vulcanized; or, the vulcanization has been effected by winding the strip around a drum, together with a sheet of lead foil or other flexible metal, so that the rubber would form a series of layers in spiral arrangement about the drum, each layer of the rubber being separated from the next by a layer of the coiled metallic sheet. The strip of rubber belting and the thin, flexible metal strip thus coiled together upon the drum or mandrel would then be placed in a steam vulcanizer and exposed to live steam for a long period. The metal strip served to impart a smooth finish to the rubber, and served also to give the necessary pressure and to conduct the heat to the interior of the mass; but this distribution of the heat from the exterior to the interior, through the medium of the metal strip, is in practice most tedious and dangerous, owing to the lack of uniformity of vulcanization incident thereto. Obviously, the outside portions or edges of the coiled strips receive the greatest heat and, as the result, the corresponding parts of the rubber are apt to be over-vulcanized long before the interior is vulcanized to any appreciable or beneficial extent. So, also, this old process is necessarily a slow and tedious one, because, to insure anything like satisfactory results the heating of the mass must occur under a very gradual rise of temperature and must continue for many hours. These disadvantages of the old process have long been recognized, and yet the fact remains that millions of pounds of rubber are vulcanized annually in such crude and unsatisfactory manner. Occasionally, the vulcanization of belting or like material, in strip form, is effected by the combination of the " press and coiled strip " methods above described and, in such case, the spiral or coiled strip treatment is ordinarily first used to set the edges of the rubber strip, after which the strip would be run through a press to effect a more uniform finishing cure. This combination method, however, obviously increases the labor of handling and the quantity of steam required; and, the press method of vulcanization itself is uneven where the sectionally cured or vulcanized parts meet. With the methods above described, there is also an immense heat loss due to the condensation of steam through radiation, conduction and convection from the pipes, presses and vulcanizers, even when precaution is taken to cover the parts with nonconductors, the loss of steam being many times in excess of the steam actually required to furnish the heat for the chemical reaction involved in the actual vulcanization of the rubber.

My present invention not only effects a vast saving in heat and thus insures a corresponding economy in practice, but it enables the vulcanization of the rubber to be effected much more uniformly and in a far shorter time and with much less labor than is possible with any prior method known to the art. Thus, considering my method as applied to the vulcanization of rubber strips designed for belting, packing, or the like, the invention consists in coiling together the sheet to be vulcanized and a thin sheet of flexible metal, and in passing electric current through the metal coil of sufficient intensity and for the proper length of time to insure the vulcanization of the rubber. In this way the heat, due to the passage of electric current, is delivered at the same time to all parts of the metal strip and, as a result, every part of the rubber strip is subjected for the same length of time to the action of the heat. The advantages of thus vulcanizing rubber in strip form will be readily recognized by those familiar with the art, and will be more readily understood from a consideration of the following description. When the metal strip and the strip of rubber to be vulcanized are coiled together, the result is a mass comprising plural plies or thicknesses of rubber with intermediate lays of metal electrically heated; and this feature of disposing the rubber to be vulcanized in plural plies between plural layers of metal to be heated, can be availed of in various ways as, for example, by folding the metal strip in zig-zag fashion upon itself with the rubber to be vulcanized disposed between the folds of the strip, or, by employing a plurality of individual metal strips or plates in electrical circuit with the rubber to be vulcanized interposed between such strips or plates. In order to effect the proper distribution of the heat throughout the metal strip or plate, I provide the strip or plate at the ends or opposite points at which the electrical terminals are connected with suitable distributers adapted to cause the electric current to traverse evenly the whole body of the strip and by so doing to more uniformly heat the entire strip than would occur if the electric terminals were joined directly to the strip or plate. By this means also the danger of burning that part of the strip adjacent the electrical terminals is avoided. This feature of my invention will be found of advantage in many situations in which the heating of a very thin strip of metal is to be effected in securing the vulcanization of rubber articles. Thus, for example, in vulcanizing rubber articles within molds, the mold may be lined with a thin sheet of metal, properly insulated from the mold (if the latter be formed of metal) and, to insure the proper distribution of the electric current throughout the lining of the mold, those portions of the lining adjacent the electrical terminals will be provided with suitable means for distributing the electric current.

In practice, it frequently occurs that certain parts of a rubber article to be vulcanized need to be subjected to a higher degree of heat than other parts. Thus, for example, in the manufacture of belting, if it is desired to join together several strips in order to form practically a single strip of considerable length, the ends of the strips will be spliced and united by rubber cement, which will be vulcanized at the time that the remaining portions of the strips are vulcanized; but, obviously, a greater amount of heat will be required to effect the vulcanization of the spliced ends of the strips with the intermediate layer of rubber cement, than is necessary for the remaining portions of the strip. In order to effect a substantially uniform vulcanization, at the same time, of the whole rubber strip—including the united end portions—I provide that part of the metal plate or strip that is to come opposite the spliced end portions of the rubber strips with means for increasing the resistance at such point to the passage of the electric current, thereby correspondingly increasing the temperature at such point. This increase of temperature at any predetermined point of the metal strip may be effected in a variety of ways, as, for example, by decreasing the area of the metal strip at such point, (which may be done by making the plate thinner, or by forming it with cut-away spaces), or by interposing in the metal strip at such point a metal of greater resistance. This feature of the invention will be found of advantage also in vulcanizing a variety of rubber articles—such, for example, as corrugated rubber mats, corrugated rubber tires, or the like, where the thicker portions of the rubber need to be subjected to a higher heat in order to insure their vulcanization in the same length of time in which the vulcanization of the thinner portions is effected.

Referring to the accompanying drawings, Figure 1 is a view in vertical section on line 1—1 of Fig. 2, showing an aparatus for effecting the vulcanization of a strip or strips of rubber designed for the manufacture of belting, packing, or the like. Fig. 2 is a view in central vertical section through Fig. 1. Fig. 3 is an enlarged longitudinal sectional view of a portion of the metal heating strip. Fig. 4 is a view in elevation of a press provided with laterally heated plates for vulcanizing rubber in molds. Fig. 5 is a cross sectional view through two pressure plates showing a modified form of heating plate. Fig. 6 is a detail side view of a heating plate embodying my invention. Fig. 7 is a view in elevation of clamping jaws holding a heating plate against a section of rubber belting. Fig. 8 is a view in cross section through a rubber tire having heating plates shown in Fig 6 applied thereto. Figs. 9 and 10 are views in plan and vertical section, respectively, of a mold having a lining plate embodying my invention.

Referring to the apparatus shown upon Sheet 1 of the drawings—and which is more especially designed for the vulcanization of rubber belting, packing, or the like—A designates a frame, the sides whereof are provided with journal bearings $a$ for supporting the ends of the mandrel B. This mandrel may be provided at one end with a gear wheel $b$ whereby it may be turned in the usual manner. As the mechanism for turning the mandrel to coil or uncoil the material wound thereon forms no part of the present invention, it is not deemed necessary to illustrate such mechanism in the drawings. As shown, the mandrel B has a square wooden portion C adapted to set over the correspondingly square central portion of the mandrel B; and this wooden portion C of the mandrel is preferably covered with a metal (preferably copper) strip $c$ to which one of the terminals 2 of the electric circuit 3 will be connected. This metal strip $c$ constitutes an electrical distributer and against it will bear the inner end $d$ of the metal strip or plate D through which the electric current will be passed to insure the heating of the rubber strip to be vulcanized. The metal strip or plate D, which will be of thin, flexible metal—for example, aluminum—will be coiled upon the mandrel, as shown in Figs. 1 and 2 of the drawings, and between the coils or layers of the metal strip will be correspondingly coiled the layers of the rubber strip E from which the belting, packing, or the like, is to be formed. The outer end of the metal strip D is provided with a distributer plate or bar F (preferably of copper) extending from side to side of the strip, and to this distributer bar F will be connected the terminal 4 of the electric circuit 3. When the strip of metal D and the strip of rubber E have been thus coiled together, a suitable band or strip G will be fastened about the coil in order to prevent the uncoiling of the strips. Preferably, the coiled strips D and E will be inclosed by a suitable covering to prevent the loss of heat during the vulcanizing operation. As shown, a casing H,—preferably of some non-conducting material, or of metal lined with a non-conducting material,—is employed for preventing the loss of heat from the coils and, preferably, this casing H is formed of two sections hinged together as at $h$ and connected by a suitable clamp or latch $h'$ at the opposite side of its periphery. The electrical terminals 2 and 4 may be secured to the casing H, as shown in Fig. 2, in which event the distributer $c$ at the inner end of the metal plate D would be provided with a strip or wire leading to the terminal 2; and, the distributer plate or bar F will be provided with a wire or plate for joining it to the opposite electrical terminal 4. A thermometer 6 may extend through the casing H in order to indicate the temperature therein. When the strip of metal D and rubber have been coiled together, as shown in Figs. 1 and 2, electric current from the dynamo 8 or other suitable source will be passed through the metal strip or plate D. The strip D being thus heated, will impart to all portions of the rubber strip E the heat necessary to effect the vulcanization of the rubber. Manifestly, the degree of heat and the duration of the vulcanizing operation will vary with varying conditions. Thus, the different qualities of the rubber or rubber compounds, and different thicknesses of the rubber strips, will require exposure to different degrees of heat, or for different lengths of time. So, also, the character of the plate D, $i. e.$, the particular metal of which it is formed, its thickness, etc., will correspondingly affect the period during which the process of vulcanization will extend. As best illustrating how such variations as those above mentioned would affect the period of vulcanization, I may mention a few of the first experimental tests made with the invention. Thus, for example, to vulcanize a strip of rubber packing of high grade stock, 5 feet long, 1/16th of an inch thick and about 7 inches wide, I have employed an aluminum strip 5 feet long, 7 inches wide and 8/1000 of an inch thick, this strip and the strip of rubber belting being wound about a copper rod about 1 1/4 inch thick, against which the aluminum strip bore and which served as an electrical distributer for the inner end of the metal strip. The opposite end of the metal strip was provided with an electrical distributer consisting of a bar of copper about 1/2 an inch wide, 7 inches long and about 1/4 of an inch thick, and the electric terminals were attached respectively to the inner and outer distributers. An electric current of 450 amperes and with a voltage of 86/100ths was passed through the aluminum strip for a period of 28 minutes, after which the strips of aluminum and rubber were immediately unwound from the mandrel and the rubber was found to be perfectly and uniformly vulcanized throughout. In such treatment, the coiled strips of rubber and aluminum were covered with an asbestos jacket which served to better retain the heat during the vulcanizing operation. During this vulcanizing operation the temperature within the asbestos covering, that inclosed the coiled metal and rubber, rose from that of the room, viz: 70° Fahrenheit to 285° Fahrenheit. Another experimental test was the following, viz: A strip of rubber packing of cheap stock, about 7 inches wide, 1/16 of an inch thick and 5 feet long, was subjected to the heating action of an aluminum strip 5 feet long, 7 inches wide and 22/1000 of an inch thick. In this case the rubber and metal strips were coiled together on a copper rod such as above described, and the outer end of the aluminum strip was provided with a copper distributer like that above mentioned. An electric current of 639 amperes and having a potential of 1.13 volts, was passed through the metal strip for 32 minutes, at the end of which time the strips were immediately uncoiled and the rubber was found to be perfectly vulcanized. During the vulcanizing period of 32 minutes the temperature adjacent the coiled strips, which were surrounded by an asbestos covering to prevent radiation, rose from the temperature of the room, viz: 70° Fahrenheit to 300° Fahrenheit. Manifestly, the period of vulcanization may be materially shortened by increasing the rate at which the current is delivered through the metal plate. In another instance I have vulcanized a strip of rubber packing of cheap stock, about 5 feet long, 7 inches wide and 1/16 of an inch thick, coiled together with an aluminum strip 5 feet long, 7 inches wide and 22/1000 of an inch thick, with electrical distributers at its ends, such as above described, in a period of twelve minutes. In such last mentioned case the electrical current passed through the metal strip was of 825 amperes and having a potential of 1.44 volts. In this last mentioned test, however, the asbestos covering was retained about the coiled strips for about four minutes after the electrical current had been cut off. In the several above mentioned tests a 60-cycle alternating current, passed through a transformer, was employed.

From the foregoing it will be readily seen that the period of vulcanization can be increased or shortened by correspondingly varying the strength of the electric current, regardless of all other conditions.

The apparatus illustrated upon Sheet 1 of the drawings is designed for effecting the vulcanization of rubber belting, packing, or the like, upon a commercial scale and, with such apparatus, the length of the rubber strip and the length of the thin metal plate coiled therewith will be about the same as in the "coiled" method of vulcanizing by steam hereinbefore described. In using this apparatus, the strip of belting and the thin strip or plate of metal will be coiled about the mandrel, as indicated in the drawing, after which the sections of the casing H will be placed in position as shown, the electric current will be connected with the electric distributers at the ends of the metal strip or plate and current will then be caused to flow through the plate to effect the vulcanization of the rubber strip. In Fig. 3 of the drawing, there is illustrated upon an enlarged scale a longitudinal section of the metal strip to show one way in which the resistance of portions of the metal strip may be increased in order to create at such point or points a higher degree of heat for the purpose of vulcanizing the thicker portions of the rubber strip. Thus, in Fig. 3, the metal strip D is shown as formed with a short, thinner section D' extending across the strip D that will offer greater resistance to the passage of the electric current and will, hence, create at such point a higher degree of heat. In coiling the strip of rubber about the mandrel, the spliced ends of the rubber strip sections that are united by rubber cement will be arranged co-incident with the thinned portion D' of the metal strip. The result will be that when electric current is passed through the metal strip a higher degree of heat will be imparted to the spliced end portions of the rubber strip and their vulcanization will be effected in the same manner with the remaining thinner portions of such strip. Obviously, the feature of my invention that consists in forming the heating strip at different points with sections of different electrical resistance is susceptible of wide application, as will hereinafter more fully appear.

In Fig. 4 of the accompanying drawings, features of my invention are illustrated in connection with a press that is shown as applied to the heating of molds containing the rubber articles to be vulcanized, the molds being heated by the passage of electric current through plural layers of thin metal plates. In Fig. 4 10 designates the platen and 11 denotes the head of a press that may be of any suitable construction. The molds K containing the articles of rubber to be vulcanized, are placed between the thin metal plates $D^2$. The plates $D^2$ are suitably insulated from the platen and head of the press, (if these be of metal), by sheets 12 of insulating material, and similar sheets of insulating material will be interposed between one side of each mold and the adjacent metal plate $D^2$ to prevent the short circuiting of the electric current through the molds. The several plates $D^2$ might be formed of one continuous sheet arranged in zig-zag manner, or, as shown in the drawings, individual plates may be employed. These individual plates $D^2$ are of thin metal and are provided at their ends with electric distributers $d'$ and $d^2$. One of the electric distributers of the lowermost plate is connected to one of the electric wires 3 and the corresponding distributer at the end of the uppermost plate is similarly connected to the electric wire 4. The distributers of the several plates $D^2$ are connected together, as shown, by suitable plates or wires $d^3$ to insure the passage of the current through the several plates between which the molds K are disposed. From the foregoing description it will be seen that when the molds K are filled with the rubber to be vulcanized, they will be piled one above the other with the heating plates interposed between the molds and the platen 10 of the press will be raised so as to tightly hold the heating plates against the molds. Current will then be passed through the several heating plates to effect the vulcanization of the rubber articles contained within the molds.

In Fig. 5 there is illustrated the application of the invention to the vulcanization of a corrugated rubber mat. In this figure of the drawings, 15 and 16 denote respectively two surfaces (for example, the head and platen of a press) between which the rubber mat to be vulcanized will be held. The rubber mat M has its upper surface corrugated, with the result that the mat is of different thicknesses at different points. The mat M is insulated from the platen 16 (if the platen be of metal) by a plate 17 of insulated material. Over the mat M is placed a corrugated metal plate $D^4$, provided at its end with bars, preferably of copper, forming electrical distributers, to which bars the wires 3 and 4 of the electric circuit will be connected. Inasmuch as the metal plate $D^4$ has one of its surfaces corrugated, it is obvious that different parts of the corrugated plate will have different degrees of heat imparted thereto. The thinner portions of the plate D, which come opposite the thicker portions of the rubber mat M, will offer a greater resistance to the passage of electric current than the thinner portions of the plate $D^4$ and, hence, will be more highly heated than the thicker portions of the metal plate opposite the different portions of the corrugated mat. Hence, it will be seen that when electric current is passed through the plate $D^4$, those portions of the plate opposite the thicker portions of the mat M will impart a higher degree of heat to the thicker portions of the mat than is imparted to the thinner portions of the mat by the thinner parts of the plate and, hence, the entire body of the mat can be uniformly vulcanized within a comparatively short time.

In Fig. 6 the metal plate $D^5$ is shown as provided at its opposite ends with electrical distributers 20 and 21 connected respectively to the terminal portions 3 and 4 of the circuit wires, these distributers 20 and 21 being preferably copper bars.

In Fig. 7 the plate $D^5$ is shown as applied to the vulcanizing of a section of a rubber belt N, as, for example, the lapped and cemented ends of an endless belt. As shown, the belt N and the plate $D^5$ are held between the jaws 22 and 23 of a clamp, these jaws being drawn together by screws 24. Blocks 25 of insulating material are shown as interposed between the jaws 22 and 23. When electric current is passed through the plate $D^5$, the requisite heat will be imparted to the section of the belt N to effect its vulvanization, or the vulcanization of the rubber, whereby its lapping ends are joined.

In Fig. 8 the plate $D^5$ is shown as applied to the vulcanization of a part of a rubber tire P. This application of the invention will be found particularly advantageous in the repairing of rubber tires that have become cracked or punctured. As shown in Fig. 8, the plate D is bent around the injured portion of the tire (to which rubber cement has been applied) and the plate $D^5$ is held tightly about the surface of the tire P by means of a strap $p$ that passes around the plate $D^5$, the tire P and the rim 26 of the wheel. By passing electric current through the plate, the requisite degree of heat can be imparted thereto to effect the vulcanization of the rubber cement that has been applied to the injured portion of the tire.

In Figs. 9 and 10 of the drawings, features of my invention are shown as applied to the vulcanization of rubber articles within molds. In these figures R designates the body of the mold, the cavity of which is lined with a layer $r$ of insulating material whereon is placed the thin metal lining plate $D^6$. As shown, the insulating lining $r$ extends as at $r'$ through the ends of the mold and on these extensions $r'$ of the insulating lining rest the shanks 27 of the electric distributers 28 (preferably of copper) that are attached to the plate metal lining $D^6$ of the mold. The lining plate $D^6$ will, of course, have imparted thereto the shape or configuration required to be given to the molded article of rubber, and when the rubber article has been placed in the mold, current will be caused to pass by the wires 3 and 4 through the electrical distributers and through the metal plate $D^6$, until the vulcanization of the rubber within the mold is effected. The lining plate $D^6$ may be formed in any of the ordinary ways or by electrolytic deposition.

Having thus described my invention, what I claim as new, and desire to secure by Letters Patent, is:—

1. An apparatus for vulcanizing rubber, comprising a long, flexible conducting plate adapted to be convolutely coiled with the layer of rubber to be vulcanized between the several coils thereof, said plate being provided at its ends with terminals for the passage of an electric current through the body of said plate and means for holding the coils of said conductor plate and of the rubber to be vulcanized thereby under pressure during the vulcanizing operation, substantially as described.

2. An apparatus for vulcanizing rubber, comprising a thin metal plate having sections of different electrical resistance, and electric terminals connected to said plate.

3. An apparatus for vulcanizing rubber, comprising a metal plate having sections of varying thickness and electrical terminals attached to said plate.

4. In an apparatus for vulcanizing rubber layers, the combination of a number of superposed thin resistance layers of metal all arranged in a common circuit for the passage therethrough of an electric heating current, and means for holding the superposed resistance layers of metal with a plurality of layers of rubber between them under pressure during the vulcanizing process, the layers of rubber separating and holding the resistance layers of metal apart, substantially as described.

5. An apparatus for vulcanizing rubber, comprising a drum, a long strip of thin, flexible metal adapted to be coiled about said drum with the rubber to be vulcanized between the coils of said strip, and electrical terminals connected to the ends of said metal strip.

6. An apparatus for vulcanizing rubber, comprising a drum, a long strip of thin, flexible metal adapted to be coiled about said drum with the rubber to be vulcanized between the coils of said strip, electrical terminals connected to the ends of said metal strip, and means for inclosing said strip, when coiled with the rubber between its coils, in order to retain the heat due to the passage of current through said metal strip.

7. An apparatus for vulcanizing rubber, comprising a roll or mandrel, for supporting a coil or strip to be vulcanized, a long strip of thin flexible metal adapted to be coiled about said mandrel with the rubber intermediate between its coils, electrical terminals joined to the opposite ends of said metal strip, and a casing formed of separable sections and adapted to retain the heat of the coiled rubber and metal.

RAYMOND B. PRICE.

Witnesses:
GEO. P. FISHER, Jr.,
KATHARINE GERLACH.